United States Patent
Ahmed Sheriff

(10) Patent No.: US 11,023,144 B2
(45) Date of Patent: Jun. 1, 2021

(54) METHOD AND SYSTEM FOR DYNAMICALLY ALLOCATING FRONT END PORTS IN A STORAGE DEVICE

(71) Applicant: WIPRO LIMITED, Bangalore (IN)

(72) Inventor: Rasheed Ahmed Sheriff, Bangalore (IN)

(73) Assignee: Wipro Limited, Bangalore (IN)

( * ) Notice: Subject to any disclaimer, the term of this patent is extended or adjusted under 35 U.S.C. 154(b) by 124 days.

(21) Appl. No.: 15/938,948

(22) Filed: Mar. 28, 2018

(65) Prior Publication Data
US 2019/0294351 A1   Sep. 26, 2019

(30) Foreign Application Priority Data
Mar. 21, 2018   (IN) .............................. 201841010467

(51) Int. Cl.
*G06F 3/06* (2006.01)
*G06F 17/18* (2006.01)

(52) U.S. Cl.
CPC ............ *G06F 3/0631* (2013.01); *G06F 3/061* (2013.01); *G06F 3/067* (2013.01); *G06F 3/0653* (2013.01); *G06F 3/0664* (2013.01); *G06F 17/18* (2013.01)

(58) Field of Classification Search
None
See application file for complete search history.

(56) References Cited

U.S. PATENT DOCUMENTS

| 6,981,174 B1* | 12/2005 | Hanning | G06F 11/2007 714/4.11 |
| 7,831,681 B1 | 11/2010 | Salli | |
| 10,257,031 B1* | 4/2019 | Lamoreaux | H04L 41/0896 |
| 2009/0157846 A1* | 6/2009 | Shimozono | H04L 49/253 709/218 |
| 2010/0250785 A1 | 9/2010 | Shin et al. | |
| 2016/0094461 A1* | 3/2016 | Shetty | H04L 47/20 370/235 |
| 2016/0231948 A1* | 8/2016 | Gupta | G06F 3/067 |
| 2017/0147248 A1* | 5/2017 | Chitti | G06F 3/0635 |
| 2017/0359261 A1* | 12/2017 | Avci | H04L 47/125 |

FOREIGN PATENT DOCUMENTS

EP    2 178 268    4/2010

* cited by examiner

*Primary Examiner* — Edward J Dudek, Jr.
*Assistant Examiner* — Ralph A Verderamo, III
(74) *Attorney, Agent, or Firm* — Finnegan, Henderson, Farabow, Garrett & Dunner, LLP

(57) ABSTRACT

This disclosure relates generally to storage device, and more particularly to method and system for dynamically allocating front end ports in a storage device. In one embodiment, the method may include determining a need for re-allocating a set of servers being served by a first set of front end ports from among a plurality of front end ports of the storage device, evaluating remaining ports of the plurality of front end ports to identify a second set of front end ports to serve the set of servers, dynamically updating a configuration of each of the plurality of front end ports by emulating virtual worldwide names (vWWNs) of the first set of front end ports onto the second set of front end ports, and serving the set of servers from the second set of front-end ports based on the updated configuration.

10 Claims, 12 Drawing Sheets

METHOD AND SYSTEM FOR DYNAMICALLY ALLOCATING FRONT END PORTS IN A STORAGE DEVICE

TECHNICAL FIELD

This disclosure relates generally to storage device, and more particularly to method and system for dynamically allocating front end ports in a storage device.

BACKGROUND

Digital devices, including, for example, computers, laptops, tablets, smart phones, servers, computing devices, have become ubiquitous in recent years. In an increasingly digital world, these digital devices may generate, process, distribute, and maintain a huge amount of information in various forms, thereby putting great demands on techniques for providing data storage and access to that data storage.

In an enterprise system, host computers may send input/output (I/O) requests to storage arrays to perform reads, writes, and maintenance. The storage arrays may typically process the requests in a fraction of a second. However, managing the unpredictable performance requirement of applications has always been a challenge in enterprise storage arrays. For example, in some scenarios, numerous host computers may direct large numbers of requests toward a single storage array. If the array is not able to immediately process the requests, then the requests may be queued. There are a number of techniques that may address the backend optimization to cater such situations, such as, sub-LUN tiering across several types of disks. However, front end ports allocation to a host computer or a cluster of host computers, for optimized performance of applications, continues to remain a challenge.

Existing techniques typically address the challenge of handling peak performance requirement of an application by allocating more ports for the application, but, such allocation may not be optimized as the ports may be used only for few hours of the day or week or sometimes even a month. For example, existing multi pathing solutions may be responsible to share the load across all the front-end ports configured. Each front-end port may have a specification in terms of throughput which it can provide. While allocating front end ports or resources, it's not possible to carve out a fraction of port capability. Thus, the ports may be dedicatedly allocated to meet the performance requirements. However, over allocation may lead to an increased cost, while under allocation may lead to undesirable performance. Further, such approaches may still not help in meeting dynamic performance need and unpredictable load. Since the load is unpredictable, there is no better way to manage but allocating more ports or resources which may be an overkill in terms of cost and usability. Moreover, it is difficult to identify dynamic increase in performance requirement and growth in performance requirement as there may be continuous increase in data size and load. This is specifically true in cloud platform, as there is no prediction possible on load and thereby change in the performance requirement.

SUMMARY

In one embodiment, a method for dynamically allocating front end ports in a storage device is disclosed. In one example, the method may include determining a need for re-allocating a set of servers being served by a first set of front end ports from among a plurality of front end ports of the storage device. The method may further include evaluating remaining ports of the plurality of front end ports to identify a second set of front end ports to serve the set of servers. The method may further include dynamically updating a configuration of each of the plurality of front end ports by emulating virtual worldwide names (vWWNs) of the first set of front end ports onto the second set of front end ports. The method may further include serving the set of servers from the second set of front-end ports based on the updated configuration.

In one embodiment, a system for dynamically allocating front end ports in a storage device is disclosed. In one example, the system may include a storage device, which may include a plurality of front end ports for servicing a plurality of servers, and at least one processor and a memory communicatively coupled to the at least one processor. The memory may store processor-executable instructions, which, on execution, may cause the processor to determine a need for re-allocating a set of servers, from among the plurality of servers, being served by a first set of front end ports from among the plurality of front end ports. The processor-executable instructions, on execution, may further cause the processor to evaluate remaining ports of the plurality of front end ports to identify a second set of front end ports to serve the set of servers. The processor-executable instructions, on execution, may further cause the processor to dynamically update a configuration of each of the plurality of front end ports by emulating vWWNs of the first set of front end ports onto the second set of front end ports. The processor-executable instructions, on execution, may further cause the processor to serve the set of servers from the second set of front-end ports based on the updated configuration.

In one embodiment, a non-transitory computer-readable medium storing computer-executable instructions for dynamically allocating front end ports in a storage device is disclosed. In one example, the stored instructions, when executed by a processor, may cause the processor to perform operations including determining a need for re-allocating a set of servers being served by a first set of front end ports from among a plurality of front end ports of the storage device. The operations may further include evaluating remaining ports of the plurality of front end ports to identify a second set of front end ports to serve the set of servers. The operations may further include dynamically updating a configuration of each of the plurality of front end ports by emulating vWWNs of the first set of front end ports onto the second set of front end ports. The operations may further include serving the set of servers from the second set of front-end ports based on the updated configuration.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
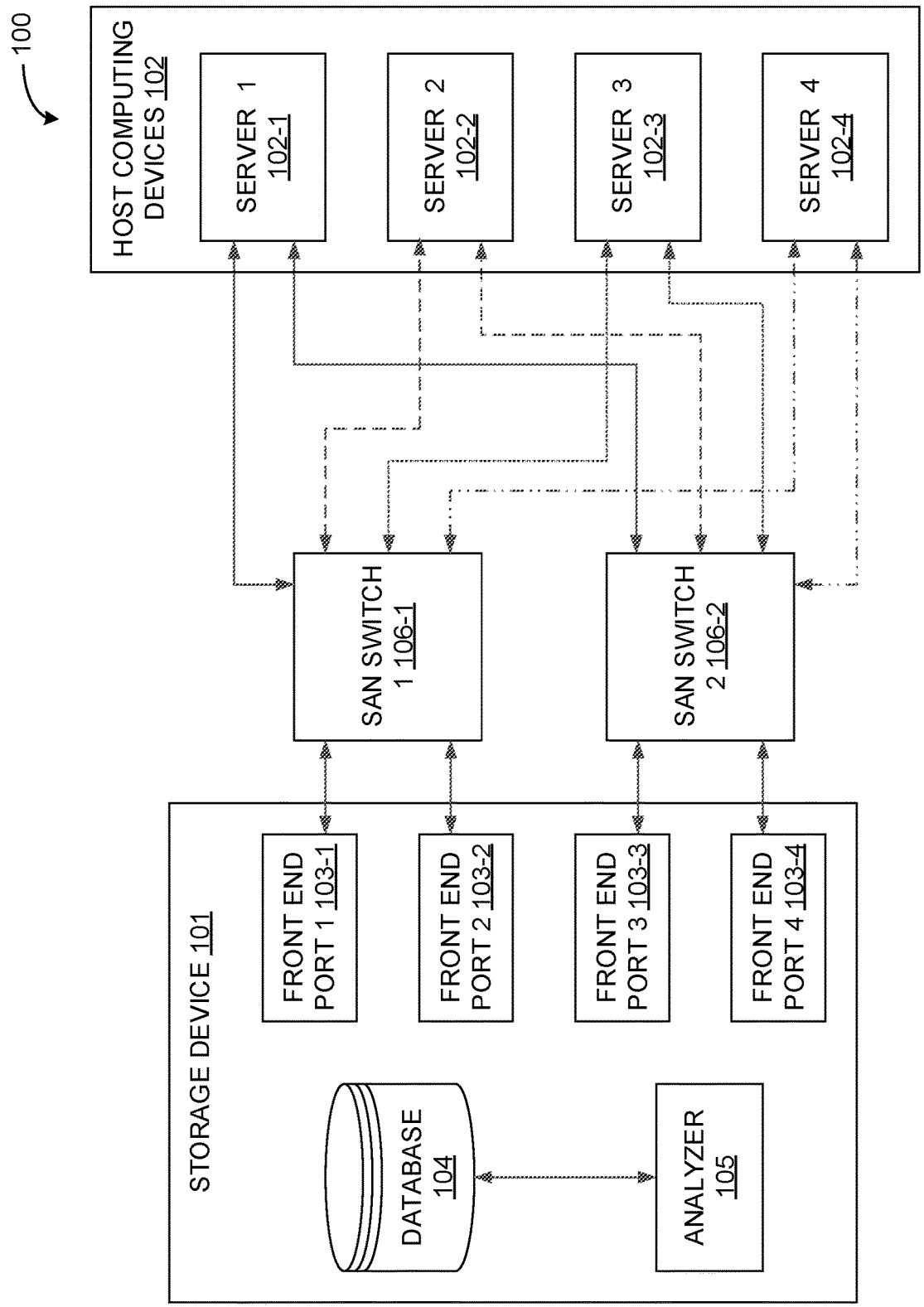
FIG. 1 is a block diagram of an exemplary system for dynamically allocating front end ports in a storage device, in accordance with some embodiments of the present disclosure.

Referring now to FIG. 1, an exemplary system 100 for dynamically allocating front end ports in a storage device is illustrated in accordance with some embodiments of the present disclosure. The system 100 may include a storage device 101 serving a number of host computing devices 102-1 through 102-4, collectively referred to as 102. The storage device 101 may be, for example, storage arrays, hard disk, or any other storage device. Further, the host computing devices 102 may be, for example, server, desktop, laptop, notebook, netbook, tablet, smartphone, mobile phone, or any other computing device. The system 100 may further include one or more storage area network (SAN) switches 106-1 and 106-2, collectively referred to as 106, configured to connect the one or more host computing devices 102 to the storage device 101.

As will be described in greater detail in conjunction with FIGS. 2-7, the storage device 101 may perform dynamic allocation of front end ports in accordance with some embodiments of the present disclosure. The storage device 101 may determine a need for re-allocating a set of servers being served by a first set of front end ports from among a plurality of front end ports of the storage device, evaluate remaining ports of the plurality of front end ports to identify a second set of front end ports to serve the set of servers, dynamically update a configuration of each of the plurality of front end ports by emulating virtual worldwide names (vWWNs) of the first set of front end ports onto the second set of front end ports, and serve the set of servers from the second set of front-end ports based on the updated configuration.

The storage device 101 may include a number of front end ports 103-1 through 103-4, collectively referred to as 103, which may be configured to connect the storage device 101 to one or more host computing devices 102, via the SAN switches 106. Once the one or more host computing device 102 are selected to be served by the storage device 101, the system 100 may emulate vWWNs in the front end ports 103 depending on the count of the one or more host computing devices 102 and the count of the plurality of front end ports 103. For example, in some embodiments, if there are 4 servers (102-1 through 102-4) and 4 front end ports (103-1 through 103-4), then the number of vWWNs to be emulated by a single front end port is 4 corresponding to each of the servers, and the total number of vWWNs to be emulated by all the 4 front end ports is 16 (4 ports×4 servers).

The storage device 101 may further include one or more processors and a dedicated memory. The dedicated memory may store instructions that, when executed by the one or more processors, cause the one or more processors to dynamically allocate front end ports in accordance with embodiments of the present disclosure. The dedicated memory may also store various data (for example, performance data of the ports, vWWNs associated with the ports, specification of the ports, thresholds for various performance parameters of the ports, and the like) that may be captured, processed, and/or required by the storage device 101.

For example, the storage device 101 may implement a database 104 that may be configured to maintain a list of all vWWNs associated with each of the front end ports 103. The database 104 may also be configured to store performance data of all the front end ports 103. The performance data may include, but is not limited to, input/output per seconds (IOPS), bandwidth, and occupancy level. In some embodiments, the database 104 may collect the data every 1 minute, and may be populated with at least one-week data. It should be noted that, in some embodiments, the storage device 101 may include a secondary database (not shown) placed within the binary files of the storage device 101. The secondary database may be configured to store new data when the database 104 may get corrupted.

The storage device 101 may further implement an analyzer 105 that may be configured to monitor each of the front end ports 103 for at least one of an error, a failure, performance issues, or future performance issues. In some embodiments, performance issue of a front end port 103 may be derived from the monitored or stored performance data of the front end port 103. Further, in some embodiments, the performance issue may include, but is not limited to, an occupancy level of the front end port 103 over a pre-defined occupancy threshold (that is, the port 103 is busy over a pre-defined percentage of time), a bandwidth consumption of the front end port 103 over a pre-defined bandwidth threshold (that is, gigabits per second through the port 103 is over a pre-defined percentage of port bandwidth) and a number of input/output (I/O) operations serviced by the front end port 103 equaling a pre-defined I/O threshold (that is, a number of I/O passing through the port 103 has reached a maximum number of I/O operations). Additionally, in some embodiments, future performance issue of a front end port 103 may be predicted based on the monitored or stored performance data of the front end port 103 over a period of time, and historical performance issues data.

The analyzer 105 may be further configured to determine a need for re-allocating a set of host computing devices 102 (say, server3 102-3 and server4 102-4) being served by a first set of front end ports 103 (say, port1 103-1 and port3 103-3) based on the monitoring. The analyzer 105 may be further configured to evaluate remaining front end ports 103 (say, port2 103-2 and port4 103-4) to identify a second set of front end ports 103 to serve the set of host computing devices 102 (that is, server3 102-3 and server4 102-4). In some embodiments, the analyzer 105 may evaluate the remaining front end ports 103 based on performance data of the remaining front end ports 103. For example, in some embodiments, the analyzer 105 may determine an occupancy level of each of the remaining ports 103, and select the second set from among the remaining ports 103 based on their occupancy level. Further, in some embodiments, the analyzer 105 may evaluate the remaining ports 103 based on a statistical trend analysis of the performance data. Additionally, in some embodiments, the analyzer 105 may evaluate the remaining ports 103 based on a policy of each of the host computing devices 102 being serviced by the plurality of front end ports 103.

The analyzer 105 may be further configured to dynamically update a configuration of each of the plurality of front end ports 103 by emulating vWWNs of the first set of front end ports 103 onto the second set of front end ports 103. In other words, the analyzer 105 may be configured to decide which vWWNs need to be failed over and to which front end ports 103. In some embodiments, the analyzer 105 may ensure minimal impact to input/output (I/O) operations of host computing devices 102 being served by the front end ports 103 while dynamically updating the configuration of the front end ports 103. The analyzer 105 may then serve the set of host computing devices 102 from the second set of front-end ports 103 based on the updated configuration. It should be noted that, in some embodiments, the analyzer 105 may dynamically update the configuration of each of the front end ports 103 back to an initial configuration upon cessation of the need.

By way of an example, the analyzer 105 may initiate and perform the movement of the one or more of the host computing devices 102 (that is, servers 102-1 through 102-4) depending on the specifications and the performance data of the front end ports 103. Thus, for example, if any of the plurality of parameters in the performance data of a front end port 103 are greater than 90 percent of the specification of that port 103, then the analyzer 105 may perform the dynamic allocation of the front end ports 103. As will be appreciated, each of the front end ports 103 may be capable of handling specific number of I/O operations and bandwidth from all the host computing devices 102 connected to it. The number of I/O operations the front-end port 103 may handle, and its bandwidth may depend on one or more parameters. For example, in some embodiments, the one or more parameters may include, but may not be limited to, I/O block size, I/O profile such as read and write percentage, overhead due to frames that maintain the connection, and unused bandwidth due to short frame. When I/O operations from a specific host computing device 102 starts increasing exponentially, the front-end port's response or service time may start increasing as well, thereby causing performance issue to the one or more host computing devices 102 connected to that port 103. The percentage of port bandwidth used may also be co-related with the above factors. For example, in some embodiments, the front-end port's response or service time may go up depending on the number of I/O operations the port 103 is servicing, and the total port throughput.

In some embodiments, the analyzer 105 may ensure that it retains policy of a host computing device 102. For example, the policy may include a Gold policy (highest primacy), Silver policy (medium primacy), and a Bronze policy (lowest primacy). The analyzer 105 may ensure that dynamic allocation of the front end ports 103 is such that it does not overload a single front-end port 103 that is serving multiple high primacy host computing devices 102 (that is, Gold policy host computing device 102). For example, if there are 3 underutilized front end ports 103 for the host computing devices 102 to failover and each port 103 is serving to a Gold policy host computing device, a Silver policy host computing device, and a Bronze policy host computing device, then the analyzer 105 may prioritize using the port 103 serving the Bronze policy host computing device 102 since that has the least primacy.

Figure 2A:
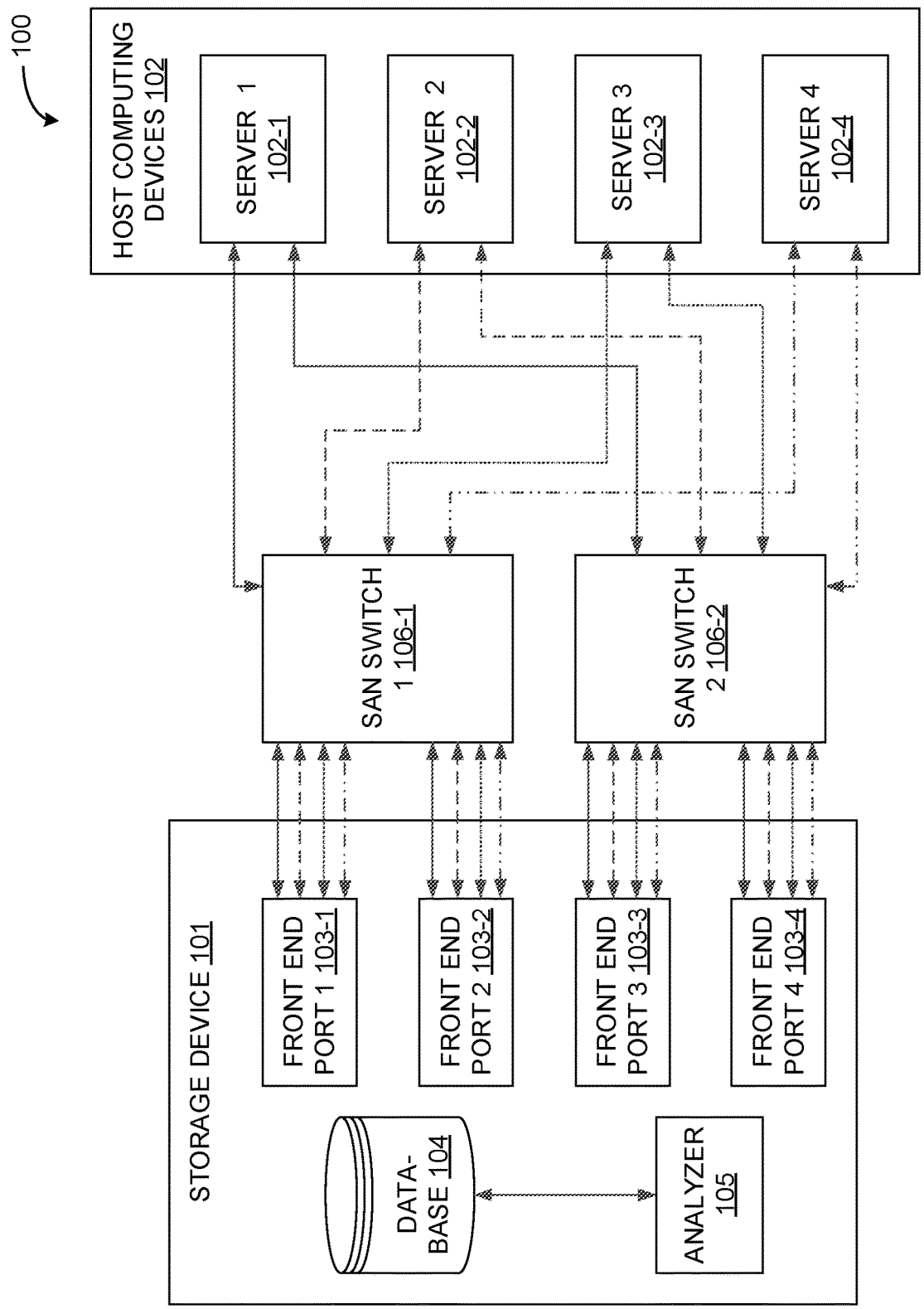
FIG. 2A is a schematic representation of an exemplary allocation of front end ports in the system of FIG. 1, in accordance with some embodiments of the present disclosure.
Figure 2B:
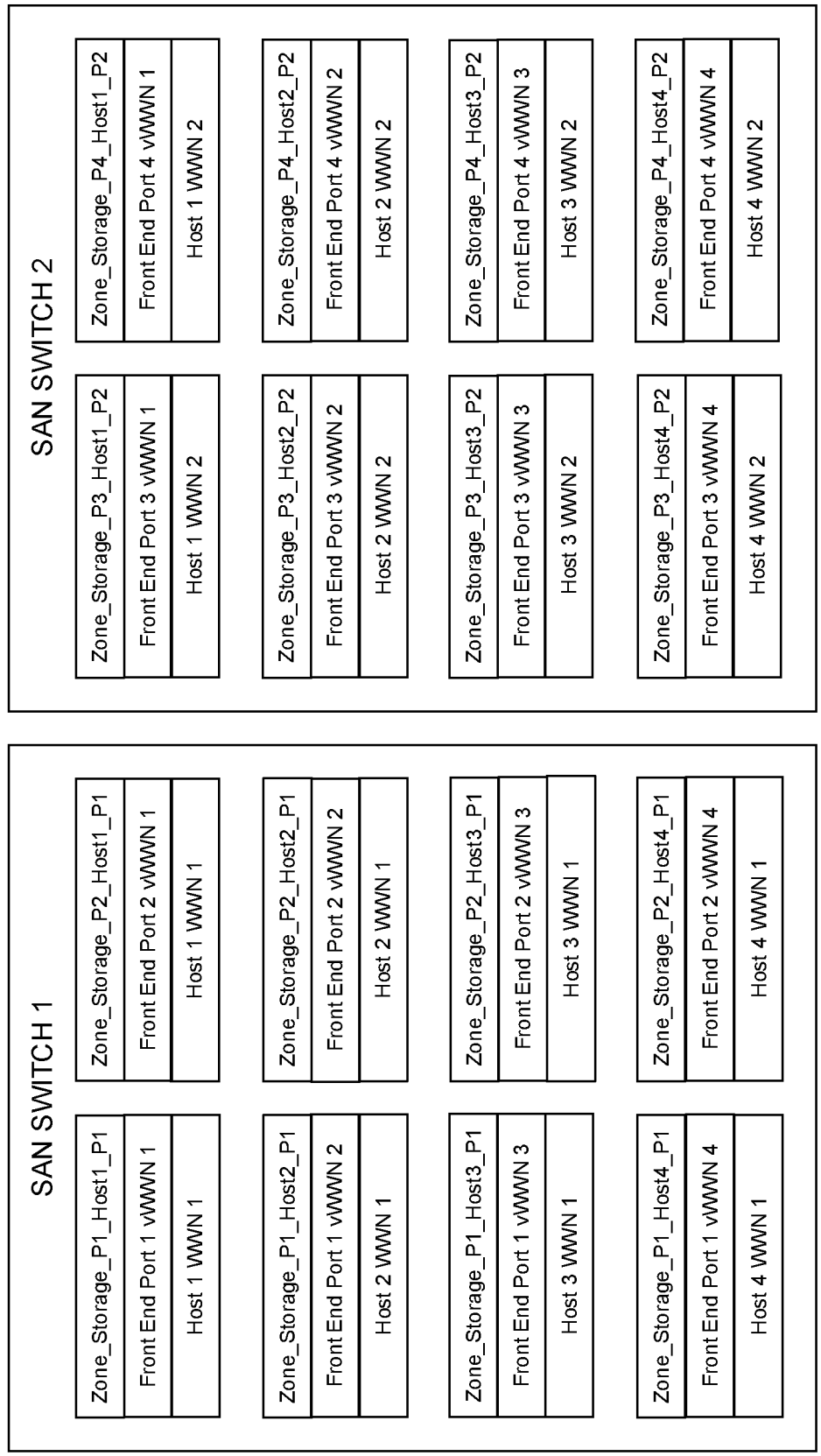
FIG. 2B is a tabular representation of front end ports configuration as per FIG. 2A, in accordance with some embodiments of the present disclosure.

Referring now to FIGS. 2-3, schematic representations of exemplary front end ports allocations in the system of FIG. 1 along with corresponding tabular representations of front end ports configurations are illustrated, in accordance with some embodiments of the present disclosure. FIG. 2A illustrates a schematic representation of an exemplary allocation of front end ports in the system of FIG. 1 at a given time (say, initially or as the start). As illustrated, the exemplary system may include one or more SAN switches 106 configured to connect one or more host computing devices 102 to a storage device 101 via front end ports 103. FIG. 2B illustrates a tabular representation of front end ports configuration (that is, vWWN configuration) as per the allocation of front end ports in FIG. 2A.

It should be noted that all the 4 host computing devices 102-1 through 102-4 have been applied as silver policy. Further, it should be noted that the initial zoning or configuration may be performed by the analyzer 105. As illustrated in FIG. 2B, a number of zones or active zones may be present in the system 100 after the initial configuration. As will be appreciated, in some embodiments, the zoning or configuration may be performed with the physical WWNs of the host computing devices 102 and vWWNs of the front end ports 103. Each of the one or more host computing devices 102 may be configured with a unique vWWN of the storage port 103. The storage device 101 may then decide whether the allocated front-end ports 103 are serving evenly to all the 4 hosting devices 102. Thus, as illustrated, Served 102-1 through server4 102-4 may be logically connected to all the 4 front end storage ports 103-1 through 103-4, and may be servicing I/Os to their connected host computing devices 102.

Figure 3A:
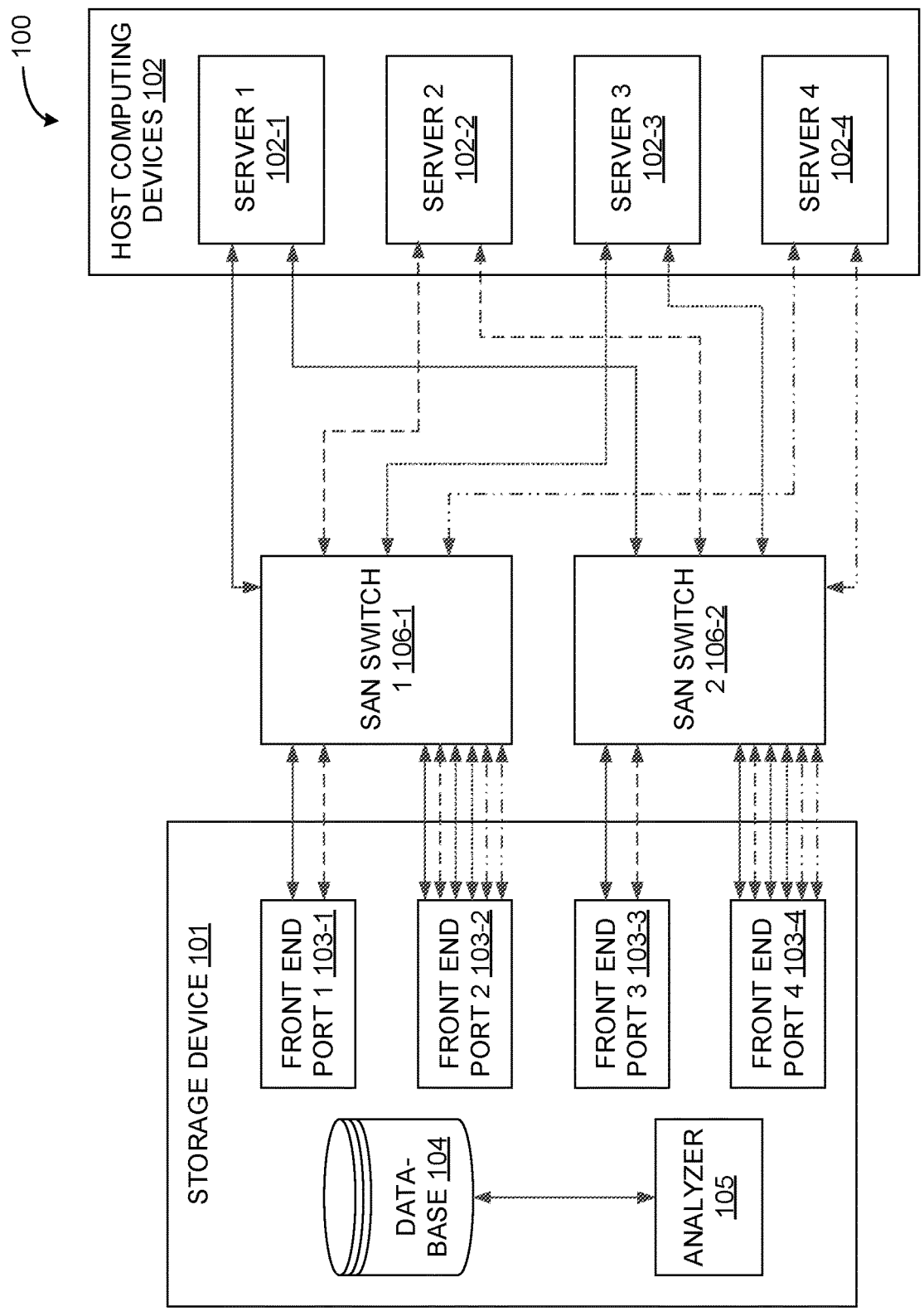
FIG. 3A is a schematic representation of an exemplary allocation of front end ports in the system of FIG. 1 subsequent to dynamic allocation, in accordance with some embodiments of the present disclosure.
Figure 3B:
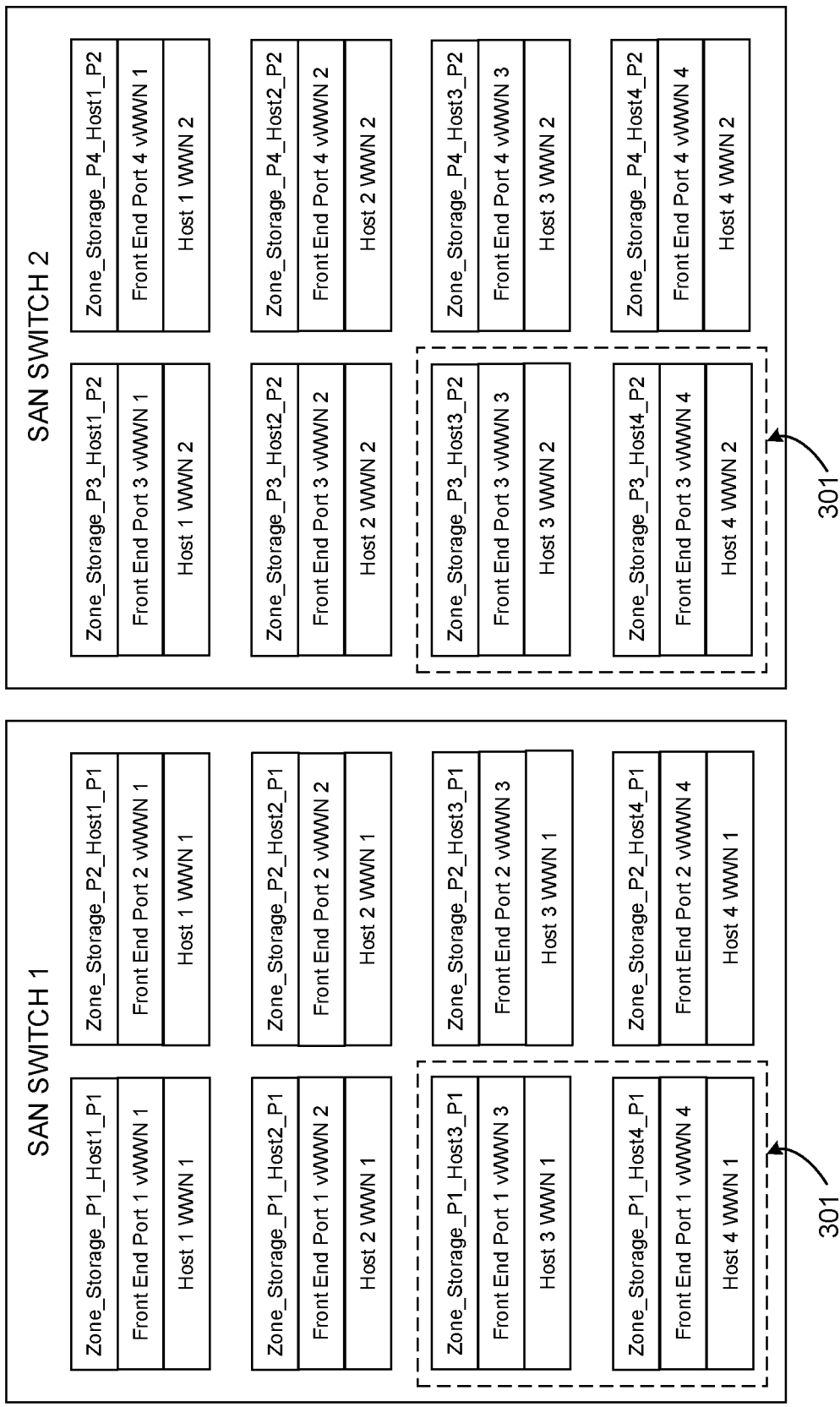
FIG. 3B is a tabular representation of front end ports configuration as per FIG. 3A, in accordance with some embodiments of the present disclosure.

FIG. 3A illustrates a schematic representation of an exemplary allocation of front end ports in the system of FIG. 1 subsequent to dynamic allocation by the analyzer 105 (that is, subsequent to the port 103 movement). Similarly, FIG. 3B illustrates a tabular representation of front end ports configuration (that is, vWWN configuration) as per dynamic allocation of front end ports in FIG. 3A. For example, some of the host computing devices 102 (say, server 1 102-1 and server 2 102-2) may start generating lot of I/O operations on all the front-end ports 103 they are connected to, thereby impacting remaining host computing devices 102 (say, server 3 102-3 and sever 4 102-4). The analyzer 105 may check all the host computing devices 102 that are sharing the front-end ports 103 with the first set of host computing devices 102 (that is, server 1 102-1 and server 2 102-2). Also, the analyzer 105 may communicate with the database 104, and may conclude that the remaining host computing devices 102 (that is, server 3 102-3 and sever 4 102-4) may run with 2 ports instead of the current 4 ports. Further, the remaining host computing devices 102 (that is, server 3 102-3 and sever 4 102-4) may be identified and marked for movement.

The analyzer 105 may then instruct the database 104 to emulate the vWWNs of the first set of front end ports 103 (say, front end port 1 103-1 and front end port 3 103-3) connected to the remaining host computing devices 102 (that is, server 3 102-3 and sever 4 102-4) to the second set of front end ports 103 (say, front end port 2 103-2 and front end port 4 103-4). Further, as will be appreciated, the vWWNs may be seamlessly moved without impacting the I/O operations and connectivity of the remaining host computing devices 102 (that is, server 3 102-3 and sever 4 102-4). As illustrated in FIG. 3B, the highlighted zones 301 may no longer be configured so as to connect the remaining host computing devices 102 (that is, server 3 102-3 and sever 4 102-4) to the storage device 101 through the first set of front end ports 103 (that is, front end port 1 103-1 and front end port 3 103-3). Instead, the remaining host computing devices 102 (that is, server 3 102-3 and sever 4 102-4) may now connect to the storage device through the second set of front end ports 103 (say, front end port 2 103-2 and front end port 4 103-4) as their vWWNs have been emulated in the second set of front end ports 103 (if not already configured).

As will be appreciated, the database 104 and the analyzer 105 may be a single module or a combination of different modules. Further, as will be appreciated, the database 104 and the analyzer 105 may reside, in whole or in parts, on one device or multiple devices in communication with each other. It should be noted that the analyzer 105 may be implemented in programmable hardware devices such as programmable gate arrays, programmable array logic, programmable logic devices, and so forth. Alternatively, the analyzer 105 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by those skilled in the art, a variety of processes may be employed for dynamically allocating front end ports in the storage device. For example, the exemplary system 100 and the associated storage device 101 may dynamically allocate front end ports by the processes discussed herein. In particular, as will be appreciated by those of ordinary skill in the art, control logic and/or automated routines for performing the techniques and steps described herein may be implemented by the system 100 and the storage device 101, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 4:
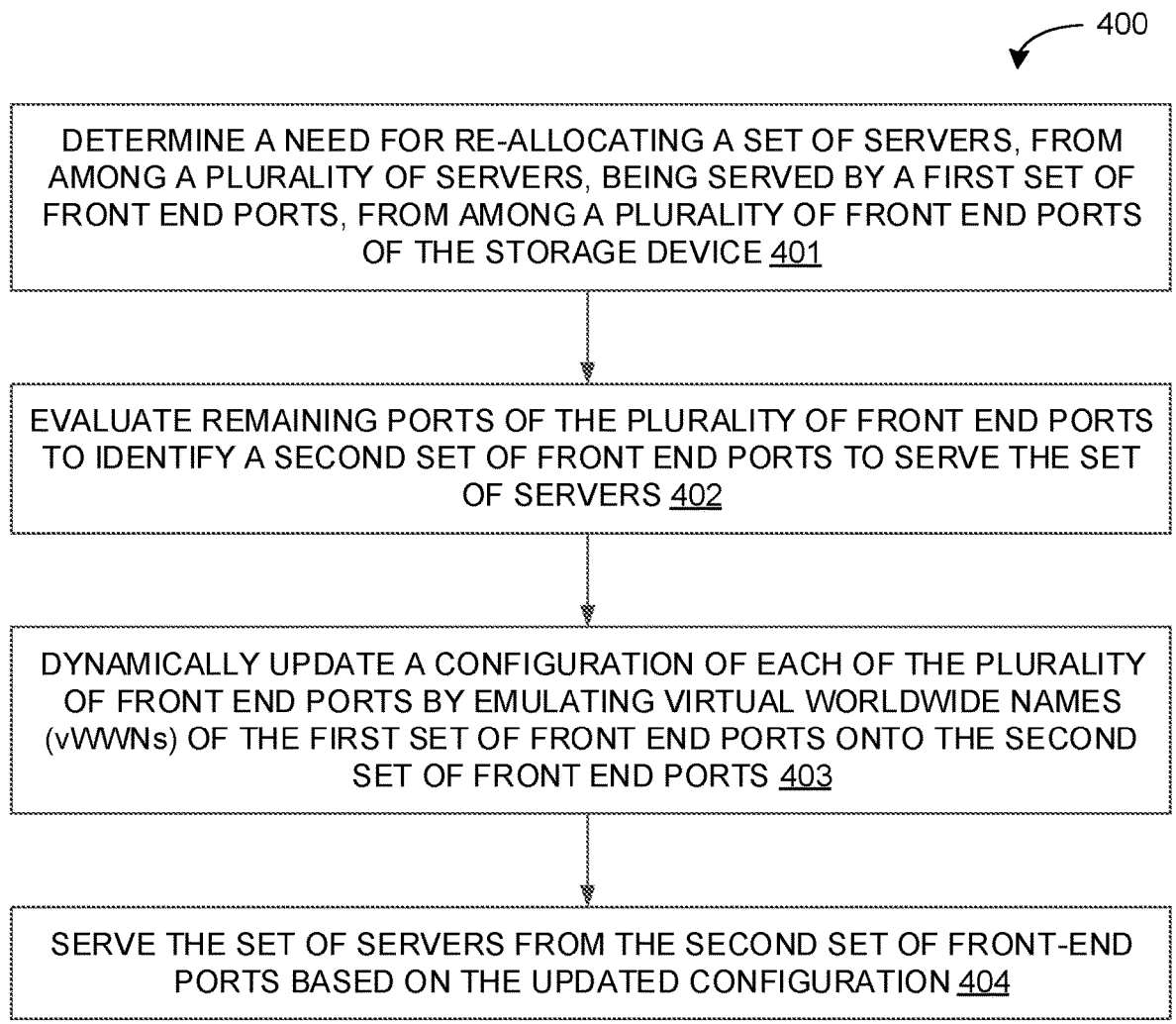
FIG. 4 is a flow diagram of an exemplary process for dynamically allocating front end ports in a storage device, in accordance with some embodiments of the present disclosure.

For example, referring now to FIG. 4, exemplary control logic 400 for dynamically allocating front end ports in the storage device via a system, such as the system 100, is depicted via a flowchart in accordance with some embodiments of the present disclosure. As illustrated in the flowchart, the control logic 400 may include the step of determining a need for re-allocating a set of servers, from among a plurality of servers, being served by a first set of front end ports, from among a plurality of front end ports of the storage device at step 401. The control logic 400 may include the steps of evaluating remaining ports of the plurality of front end ports to identify a second set of front end ports to serve the set of servers at step 402, dynamically updating a configuration of each of the plurality of front end ports by emulating vWWNs of the first set of front end ports onto the second set of front end ports at step 403, and serving the set of servers from the second set of front-end ports based on the updated configuration at step 404.

In some embodiments, determining the need for re-allocation at step 401 may further include the steps of monitoring each of the plurality of front end ports serving a plurality of servers for at least one of an error, a failure, performance issues, or future performance issues, and determining the need based on the monitoring. Additionally, in some embodiments, the performance issue of a front end port may be derived from performance data of the front end port. Further, in some embodiments, the performance issue may include at least one of an occupancy level of the front end port over a pre-defined occupancy threshold, a bandwidth consumption of the front end port over a pre-defined bandwidth threshold, or a number of input/output (I/O) operations serviced by the front end port equaling a pre-defined I/O threshold. Moreover, in some embodiments, monitoring each of the plurality of front end ports for the future performance issues may include monitoring performance data of each of the plurality of front end ports over a period of time. In such embodiments, determining the need for re-allocation at step 401 may include the step of predicting performance issues based on the monitored performance data and historical performance issues data.

In some embodiments, evaluating the remaining ports at step 402 may include the step of evaluating at least one of performance data of the remaining ports, a policy of each of a plurality of servers being serviced by the plurality of front end ports. Additionally, in some embodiments, evaluating the remaining ports at step 402 may include the steps of determining an occupancy level of each of the remaining ports, and selecting the second set from among the remaining ports based on their occupancy level. In such embodiments, evaluating the remaining ports at step 402 may further include evaluating the remaining ports based on a statistical trend analysis of the performance data.

In some embodiments, dynamically updating the configuration of each of the plurality of front end ports at step 403 may include the step of ensuring minimal impact to input/output (I/O) operations of a plurality of servers being served by the plurality of front end ports. Additionally, in some embodiments, serving the set of servers at step 404 may include the step of managing data traffic from the set of servers by employing the second set of front-end ports. In some embodiments, the control logic 400 may further include the step of dynamically updating the configuration of each of the plurality of front end ports to an initial configuration upon cessation of the need. Moreover, in some embodiments, the control logic 400 may further include the step of maintaining a database comprising the vWWNs and performance data for each of the plurality of ports.

Figure 5:
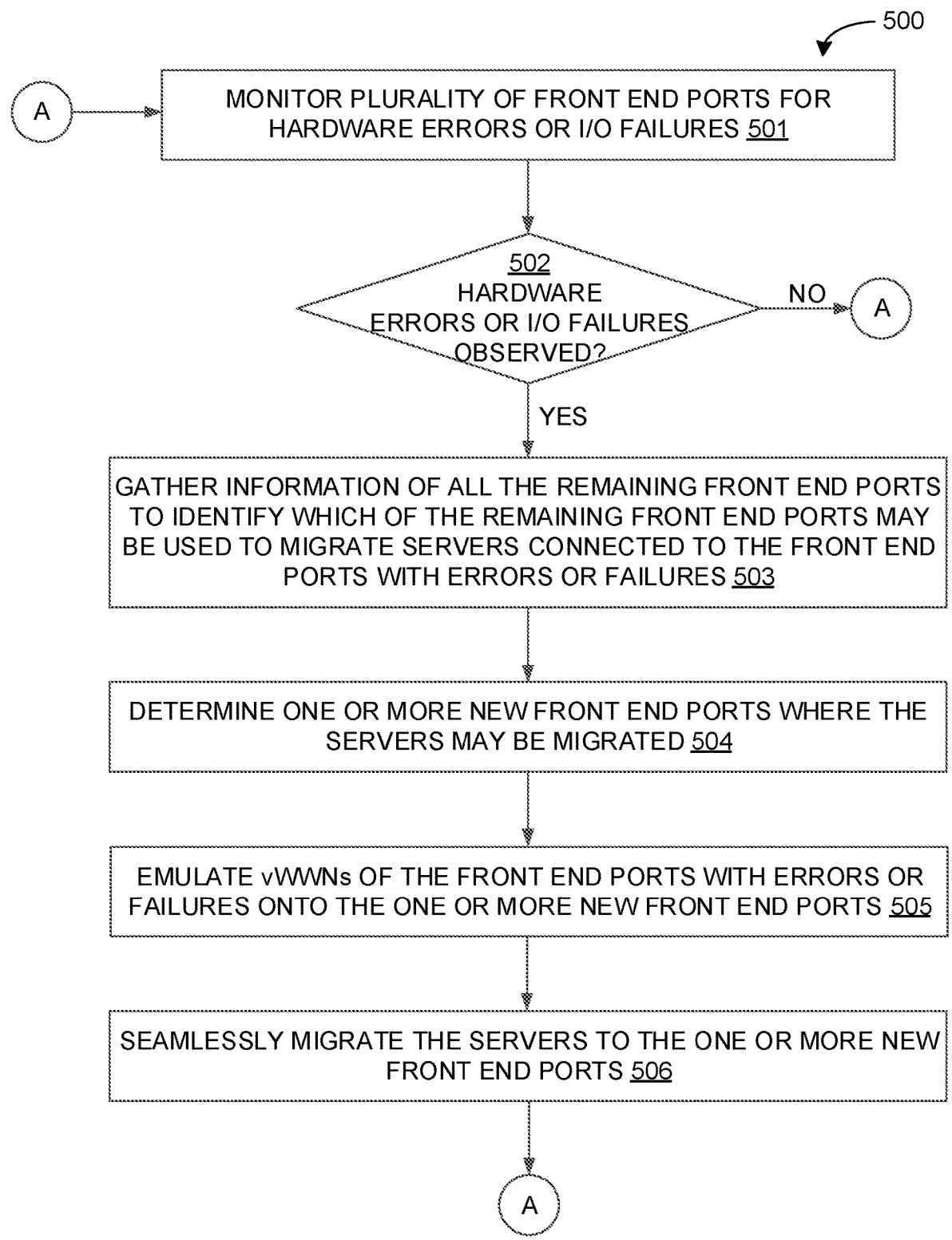
FIG. 5 is a flow diagram of a detailed exemplary process for dynamically allocating front end ports in the storage device, in accordance with some embodiments of the present disclosure.

Referring now to FIG. 5, exemplary control logic 500 for dynamically allocating front end ports in the storage device is depicted in greater detail via a flowchart in accordance with some embodiments of the present disclosure. The control logic 500 may provide for dynamic allocation of front end ports in the storage device in a scenario of port failure. In other words, the control logic 500 may provide for port virtualization in case of physical port failure. As illustrated in the flowchart, at step 501, the control logic 500 may monitor the plurality of front end ports for hardware errors or I/O failures. In some embodiments, such monitoring may be performed continuously. At step 502, the control logic 500 may determine if there are multiple hardware errors or I/O failures on one or more front-end ports. Upon determining errors or I/O failures, the control logic 500 may mark the host computing devices (for example, server) coupled to those front-end ports for movement.

At step 503, the control logic 500 may gather information of all the remaining front end ports of the storage device. The control logic 500 may then analyze the information to identify which of the remaining front end ports are underutilized and may be used to seamlessly migrate one or more of the marked host computing devices (for example, servers) connected to the front end ports with errors or failures. At step 504, the control logic 500 may decide the one or more new front end ports where the marked host computing devices may be moved or migrated seamlessly. At step 505, the control logic 500 may instruct the database to transfer the vWWNs of the marked host computing devices to the new front end ports. In particular, the control logic 500 may emulate vWWNs of the front end ports with errors or failures onto the one or more new front end ports.

At step 506, the control logic 500 may seamlessly migrate the marked host computing devices (for example, servers) to the one or more new front-end ports. Thus, the data traffic from the marked host computing devices (for example, servers) may be directed to the new front-end ports (since they are now zoned with the vWWNs). The control logic 500 may then go back to step 501 so as to monitor the plurality of front end ports for hardware errors or I/O failures.

Figure 6A:
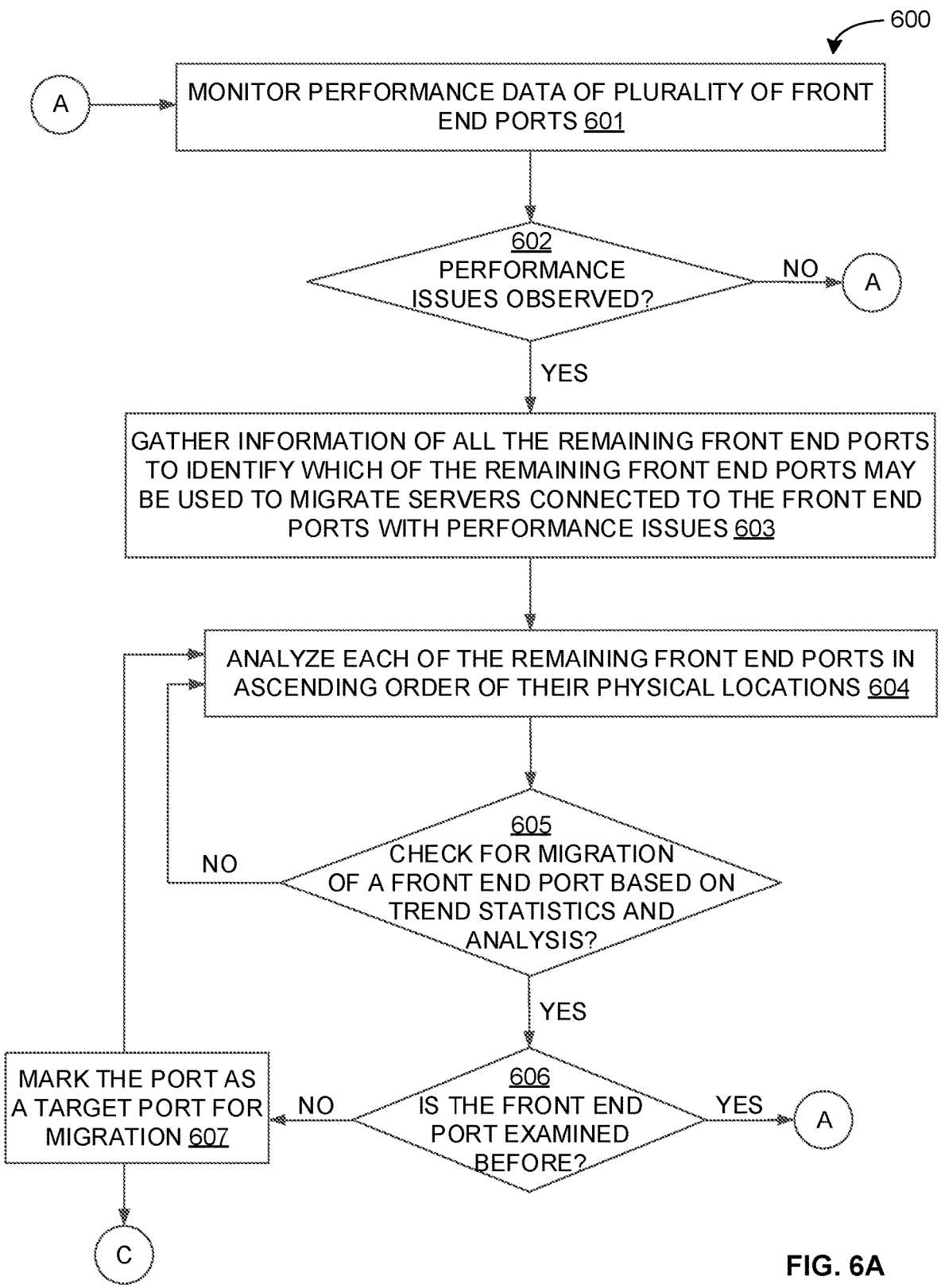
FIGS. 6A and 6B are a flow diagram of another detailed exemplary process for dynamically allocating front end ports in the storage device, in accordance with some embodiments of the present disclosure.
Figure 6B:
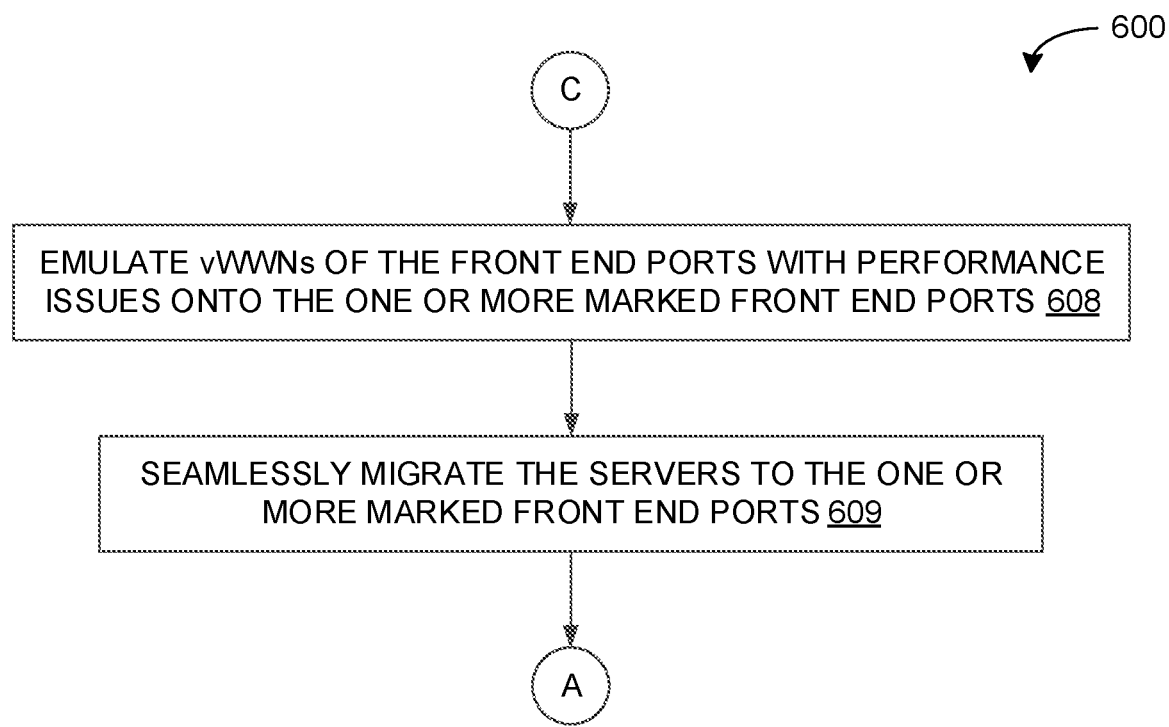

Referring now to FIGS. 6A and 6B, another exemplary control logic 600 for dynamically allocating front end ports in the storage device is depicted in greater detail via a flowchart in accordance with some embodiments of the present disclosure. The control logic 600 may provide for dynamic allocation of front end ports in the storage device in a scenario of port experiencing performance issues. In other words, the control logic 600 may provide for port virtualization in case of port experiencing performance issues. The performance issues of a port may include, but may not be limited to, the occupancy level of the port being greater than a pre-defined threshold and for greater than a pre-defined percentage of time (that is, port being busy greater than the pre-defined percentage of time), I/O operations for the port reaching a predefined maximum threshold, or a bandwidth consumption of the port being greater than a pre-defined threshold. As will be appreciated, the pre-defined thresholds may be configured by a user in the system or may be automatically configured based on machine learning.

As illustrated in the flowchart, at step 601, the control logic 600 may monitor performance data of the plurality of front end ports. As stated above, in some embodiments, such monitoring may be performed continuously. At step 602, the control logic 600 may analyze the performance data so as to determine if there are performance issues on one or more front-end ports. For example, the control logic 600 may determine if the port is busy for greater than 90% of time, or if the port has reached maximum number of I/O operations, or if the port bandwidth consumed in greater than 90% of the specified bandwidth. Upon determining performance issues, the control logic 600 may mark the host computing devices (for example, server) coupled to those front-end ports for movement.

At step 603, the control logic 600 may gather information of all the remaining front-end ports of the storage device. The control logic 600 may then analyze the information to identify which of the remaining front-end ports are underutilized and may be used to seamlessly migrate one or more of the marked host computing devices (for example, servers) connected to the front-end ports with performance issues. At steps 604-607, the control logic 600 may decide the one or more new front-end ports where the marked host computing devices may be seamlessly moved or migrated based on the port's past, present and future trend analysis, and mark such ports for seamless server migration. For example, at step 604, the control logic 600 may analyze each of the remaining front-end ports in ascending order of their physical locations. At step 605, the control logic 600 may check for migration of a port based in the trend statistics and analysis. If the port is a candidate for performing migration, then, at step 606, the control logic 600 may check if the port has been examiner before. If the port has not been examined before, then, at step 607, the port is marked for migration. In other words, the port is marked as a target port for emulating vWWNs.

Once all the remaining front-end ports been analyzed and marked, then, at step 608, the control logic 600 may instruct the database to transfer the vWWNs of the marked host computing devices to the marked front-end ports. In particular, the control logic 600 may emulate vWWNs of the front-end ports with performance issues onto the one or more marked underutilized front-end ports. At step 609, the control logic 600 may seamlessly migrate the marked host computing devices (for example, servers) to the one or more marked front-end ports. Thus, the data traffic from the marked host computing devices (for example, servers) may be directed to the marked front-end ports (since they are now zoned with the vWWNs). The control logic 600 may then go back to step 601 so as to monitor the plurality of front end ports for performance issues.

Figure 7A:
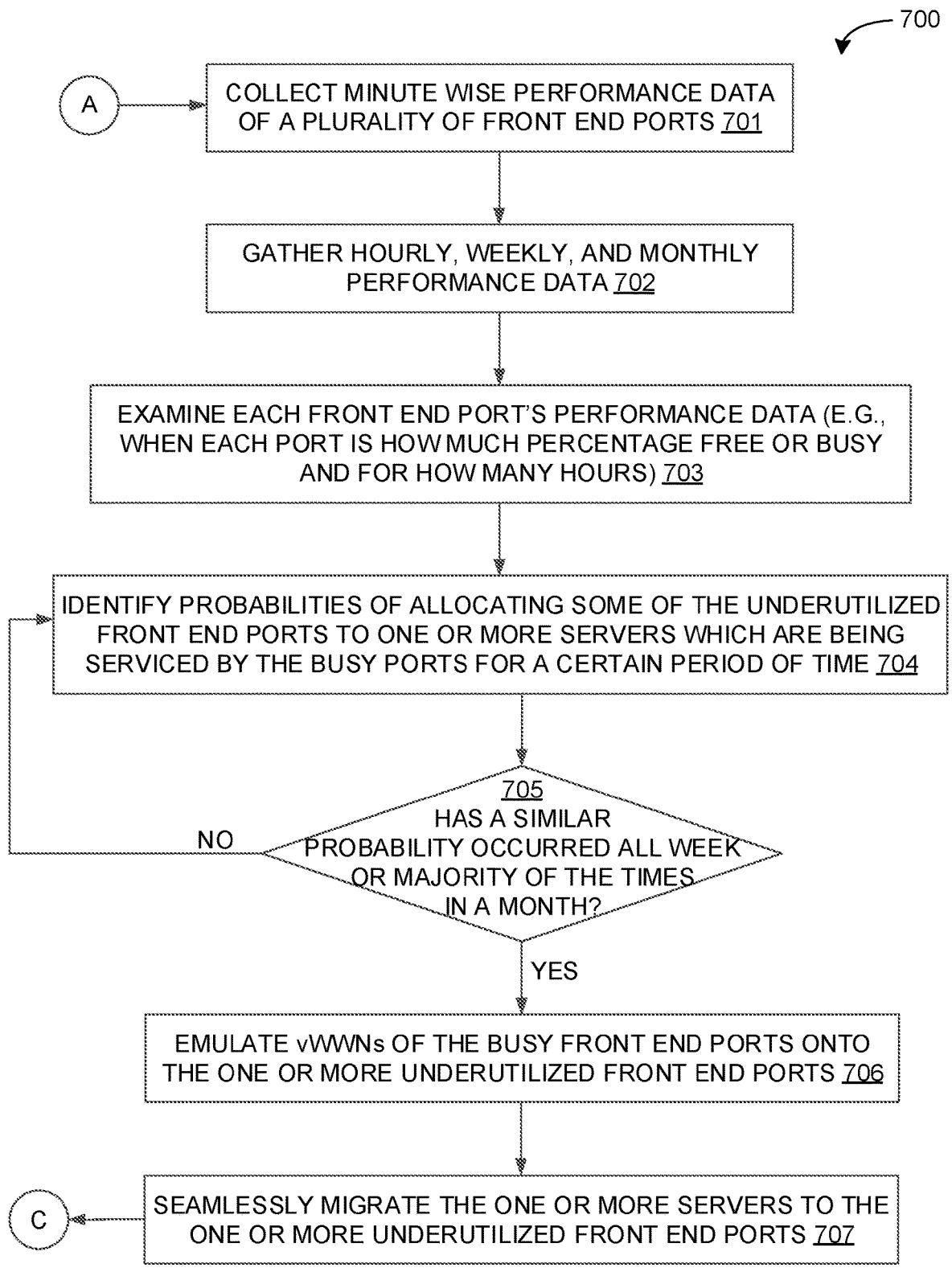
FIGS. 7A and 7B are a flow diagram of yet another detailed exemplary process for dynamically allocating front end ports in the storage device, in accordance with some embodiments of the present disclosure.
Figure 7B:
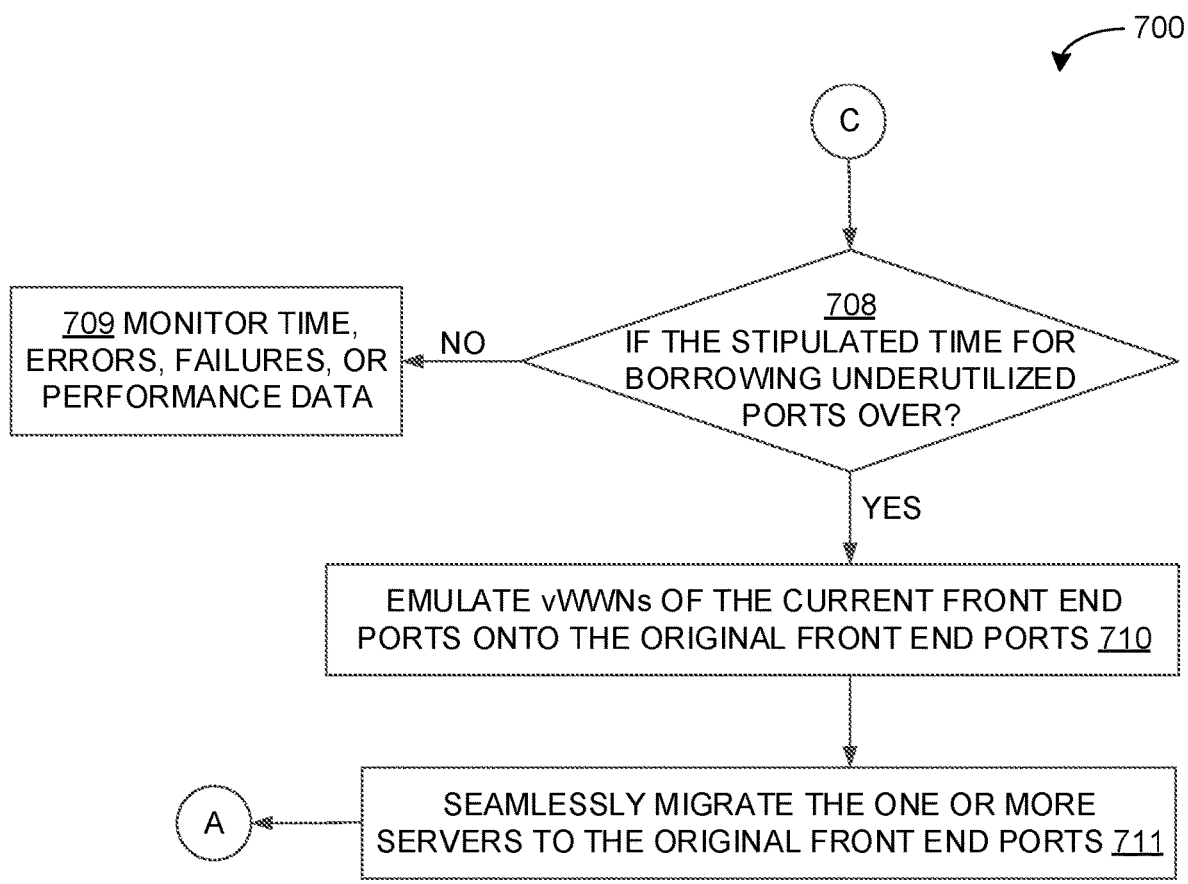

Referring now to FIGS. 7A and 7B, yet another exemplary control logic 700 for dynamically allocating front end ports in the storage device is depicted in greater detail via a flowchart in accordance with some embodiments of the present disclosure. The control logic 700 may provide for dynamic allocation of front end ports in the storage device in a scenario of future performance issues that may be experienced by the port. In other words, the control logic 700 may provide for port virtualization in case of identification of host computing devices requiring additional ports during certain period of time of a day, a week, or a month.

As illustrated in the flowchart, at step 701, the control logic 700 may continuously collect (for example, minute wise) performance data of a plurality of front end ports. At step 702, the control logic 700 may gather hourly, weekly, and monthly performance data for subsequent analysis. At step 703, the control logic 700 may analyze the gathered historical performance data to determine if there are any over-utilized front end ports. For example, the control logic 700 may examine each front-end port's performance data so as to determine when each port is how much percentage free or busy and for how many hours. At step 704, the control logic 700 may identify the probabilities of allocating some of the underutilized front-end ports to the one or more host computing devices (for example, servers) which are being serviced by the busy ports for a certain period of time. It should be noted that the control logic 700 may identify the probabilities of front end port movement without disturbing the policy of the host computing devices. For example, if there are multiple gold policy host computing devices connected to a port, then the system may not use that port for movement.

At step 705, the control logic may check if a similar probability has occurred all week or majority of the times in a month. Upon positive determination (that is, if the probability has indeed occurred all week or majority of the times in a month), the control logic 700 may schedule the movement of the port from busy ports to the underutilized ports. At step 706, the control logic 700 may instruct the database to transfer the vWWNs of the host computing devices to the identified front end ports for a stipulated time. In some embodiments, the control logic 700 may emulate vWWNs of the busy front end ports onto the one or more underutilized front end ports identified at step 704. At step 707, the control logic 700 may seamlessly migrate the host computing devices (for example, servers) to the one or more underutilized front end ports. Thus, the data traffic from the host computing devices (for example, servers) may be directed to the underutilized front-end ports (since they are now zoned with the vWWNs).

At step 708, the control logic 700 may check if the stipulated time for borrowing underutilized port(s) completed. Upon negative determination, at step 709, the control logic 700 may continue to track for stipulated time. Additionally, in some embodiments, at step 709, the control logic 700 may monitor for port failures, port errors, or port performance data. However, upon positive determination (that is, when the stipulated time is complete), at step 710, the control logic 700 may transfer the vWWNs from the currently allocated ports to the originally configured ports. In some embodiments, the control logic 700 may emulate vWWNs of the current front end ports onto the original front end ports. At step 711, the control logic 700 may seamlessly migrate the host computing devices (for example, servers) to the one or more original front end ports. Thus, the data traffic from the host computing devices (for example, servers) may be directed back to the original front-end ports. The control logic 700 may then go back to step 701 so as to collect performance data of a plurality of front end ports.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
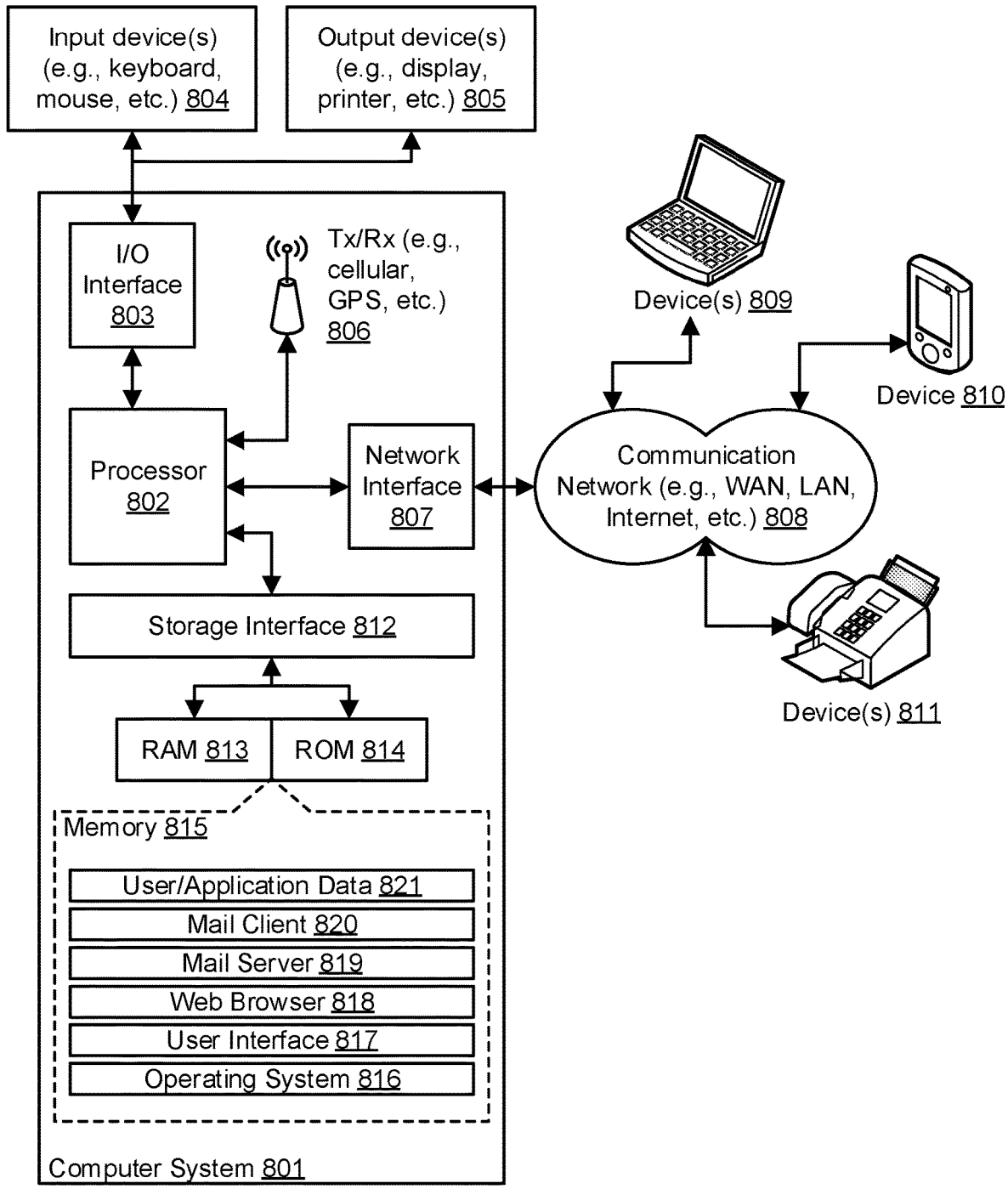
FIG. 8 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 8, a block diagram of an exemplary computer system 801 for implementing embodiments consistent with the present disclosure is illustrated. Variations of computer system 801 may be used for implementing system 100 for dynamically allocating front end ports in a storage device. Computer system 801 may include a central processing unit ("CPU" or "processor") 802. Processor 802 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 802 may be disposed in communication with a communication network 808 via a network interface 807. The network interface 807 may communicate with the communication network 808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 809, 810, and 811. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 801 may itself embody one or more of these devices.

In some embodiments, the processor 802 may be disposed in communication with one or more memory devices (e.g., RAM 813, ROM 814, etc.) via a storage interface 812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathinterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 816, user interface application 817, web browser 818, mail server 819, mail client 820, user/application data 821 (e.g., any data variables or data records discussed in this disclosure), etc. The operating system 816 may facilitate resource management and operation of the computer system 801. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 801 may implement a web browser 818 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 801 may implement a mail server 819 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 801 may implement a mail client 820 stored program component. The mail client may be a mail viewing application, such as Apple Mail, Microsoft Entourage, Microsoft Outlook, Mozilla Thunderbird, etc.

In some embodiments, computer system 801 may store user/application data 821, such as the data, variables, records, etc. (e.g., performance data of the ports, vWWNs associated with the ports, specification of the ports, thresholds for various performance parameters of the ports, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for dynamic allocation of front end ports in the storage device based on performance requirement of applications. In other words, the front end ports of the storage device may be dynamically allocated and vWWN configuration may be dynamically updated based on change in performance need and usage pattern of the applications. The techniques may, therefore, result in optimization of frond end port subscription based on cognitive analysis while catering to unpredictable load. The techniques described in the various embodiments discussed above dynamically places the host computing devices on right number of front end ports so as to meet the performance requirement upfront.

The techniques described in the various embodiments discussed above further provide for reclaiming the dynamically allocated front end ports once the need ceases (that is, load returns to normal trend, failures or errors are resolved, and so forth). The front end ports allocation and de-allocation are substantially transparent to the host computing device. In some embodiments, no configuration change may be required at the host computing device level. Additionally, there is no interruption to I/O operations during dynamic allocation of the front end ports. Further, the techniques provide for more controlled allocation of resources (that is, front end ports) with policy settings in terms of service level required for various tiers of applications. The techniques, therefore, eliminate the need for highly skilled professional to design and perform capacity planning for an enterprise environment.

In short, the techniques enables the storage device to dynamically allocate more resources (that is, front-end ports) or to dynamically update the configuration when needed so as to meet to meet unpredictable load without any disruption to the I/O operations, and to reclaim the allocated resources or to revert to original configuration when usage returns to normal state. As will be appreciated, such dynamic allocation and de-allocation is more efficient than the existing techniques that provide additional front-end ports dedicatedly to the respective host computing devices hosting the applications so as to increase the overall throughput. The techniques also provide for learning the patterns of usage, and for dynamically placing the host computing devices on right number of front end ports so as to meet the requirement upfront.

The specification has described method and system for dynamically allocating front end ports in a storage device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of dynamically allocating front end ports in a storage device, the method comprising:
   determining, by the storage device, a need for re-allocating a set of servers being serviced by a first set of front end ports from among a plurality of front end ports of the storage device based on monitoring each of the plurality of front end ports serving the plurality of servers for an error, a failure, performance issues, and future performance issues, wherein determining the need further comprises predicting future performance issues based on monitoring of performance data and historical performance issues data for each of the plurality of front end ports of the storage device over a period of time, wherein determining the need further comprises determining one or more of the first set of front end ports for dynamic re-allocation based on specification and monitored performance data of each of the front end ports;
   evaluating, by the storage device, remaining ports of the plurality of front end ports based on a statistical trend analysis of the performance data to identify a second set of front end ports to serve the set of servers, wherein evaluating the remaining ports comprises evaluating performance data of the remaining ports and evaluating a policy of each of a plurality of servers being serviced by the plurality of front end ports, and wherein the policy comprises one of a highest primacy, a medium primacy, or a lowest primacy;
   dynamically updating, by the storage device, a configuration of each of the plurality of front end ports by emulating virtual worldwide names (vWWNs) of the first set of front end ports onto the second set of front end ports depending on a count of one or more host computing devices and a count of the plurality of front end ports, wherein the configuration of each of the plurality of front end ports is dynamically updated by ensuring minimal impact to input/output (I/O) operations of the plurality of servers being serviced by the plurality of front end ports, and wherein the configuration of each of the plurality of front end ports is dynamically updated to an initial configuration upon cessation of the need; and
   serving, by the storage device, the set of servers from the second set of front-end ports based on the updated configuration.

2. The method of claim 1, wherein the performance issues of a front end port is derived from performance data of the front end port, and wherein the performance issues comprise at least one of an occupancy level of the front end port over a pre-defined occupancy threshold, a bandwidth consumption of the front end port over a pre-defined bandwidth threshold, or a number of the I/O operations serviced by the front end port equaling a predefined I/O threshold.

3. The method of claim 1, wherein monitoring each of the plurality of front end ports for the future performance issues comprise monitoring performance data of each of the plurality of front end ports over a period of time.

4. The method of claim 1, wherein evaluating the remaining ports further comprises:
   determining an occupancy level of each of the remaining ports; and
   selecting the second set of front end ports from among the remaining ports based on the occupancy level.

5. The method of claim 1, further comprising maintaining a database comprising the vWWNs and performance data for each of the plurality of front end ports.

6. A system for dynamically allocating front end ports in a storage device, the system comprising:
   a storage device comprising:
   a plurality of front end ports for servicing a plurality of servers; and
   at least one processor and a memory storing instructions that, when executed by the at least one processor, cause the at least one processor to perform operations comprising:

determining a need for re-allocating a set of servers, from among the plurality of servers, being serviced by a first set of front end ports from among the plurality of front end ports, wherein determining the need for re-allocating a set of servers is based on monitoring each of the plurality of front end ports serving the plurality of servers for an error, a failure, performance issues, and future performance issues; wherein determining the need further comprises predicting future performance issues based on monitoring of performance data and historical performance issues data for each of the plurality of front end ports of the storage device over a period of time, wherein determining the need further comprises determining one or more of the first set of front end ports for dynamic re-allocation based on specification and monitored performance data of each of the front end ports;

evaluating remaining ports of the plurality of front end ports based on a statistical trend analysis of the performance data to identify a second set of front end ports to serve the set of servers, wherein evaluating the remaining ports comprises evaluating performance data of the remaining ports and evaluating a policy of each of a plurality of servers being serviced by the plurality of front end ports, and wherein the policy comprises one of a highest primacy, a medium primacy, or a lowest primacy;

dynamically updating a configuration of each of the plurality of front end ports by emulating virtual worldwide names (vWWNs) of the first set of front end ports onto the second set of front end ports depending on a count of one or more host computing devices and a count of the plurality of front end ports, wherein the configuration of each of the plurality of front end ports is dynamically updated by ensuring minimal impact to input/output (I/O) operations of the plurality of servers being serviced by the plurality of front end ports, and wherein the configuration of each of the plurality of front end ports is dynamically updated to an initial configuration upon cessation of the need; and serving the set of servers from the second set of front end ports based on the updated configuration.

7. The system of claim 6, wherein the performance issues of a front end port is derived from performance data of the front end port, and wherein the performance issues comprise at least one of an occupancy level of the front end port over a pre-defined occupancy threshold, a bandwidth consumption of the front end port over a pre-defined bandwidth threshold, or a number of the I/O operations serviced by the front end port equaling a pre-defined I/O threshold.

8. The system of claim 6, wherein monitoring each of the plurality of front end ports for the future performance issues comprise monitoring performance data of each of the plurality of front end ports over a period of time.

9. The system of claim 6, wherein evaluating the remaining ports further comprises:
    determining an occupancy level of each of the remaining ports; and
    selecting the second set of front end ports from among the remaining ports based on the occupancy level.

10. A non-transitory computer-readable medium storing computer-executable instructions for:
    determining a need for re-allocating a set of servers being served by a first set of front end ports from among a plurality of front end ports of a storage device, wherein determining the need for re-allocating a set of servers is based on monitoring each of the plurality of front end ports serving the plurality of servers for an error, a failure, performance issues, and future performance issues, wherein determining the need further comprises predicting future performance issues based on monitoring of performance data and historical performance issues data for each of the plurality of front end ports of the storage device over a period of time, wherein determining the need further comprises determining one or more of the first set of front end ports for dynamic re-allocation based on specification and monitored performance data of each of the front end ports;

evaluating remaining ports of the plurality of front end ports based on a statistical trend analysis of the performance data to identify a second set of front end ports to serve the set of servers, wherein evaluating the remaining ports comprises evaluating performance data of the remaining ports and evaluating a policy of each of a plurality of servers being serviced by the plurality of front end ports, and wherein the policy comprises one of a highest primacy, a medium primacy, or a lowest primacy;

dynamically updating a configuration of each of the plurality of front end ports by emulating virtual worldwide names (vWWNs) of the first set of front end ports onto the second set of front end ports depending on a count of one or more host computing devices and a count of the plurality of front end ports, wherein the configuration of each of the plurality of front end ports is dynamically updated by ensuring minimal impact to input/output (I/O) operations of the plurality of servers being serviced by the plurality of front end ports, and wherein the configuration of each of the plurality of front end ports is dynamically updated to an initial configuration upon cessation of the need; and serving the set of servers from the second set of front-end ports based on the updated configuration.

* * * * *